(12) United States Patent
Carnes, III et al.

(10) Patent No.: US 12,101,329 B2
(45) Date of Patent: *Sep. 24, 2024

(54) NETWORK ARCHITECTURE PROVIDING DEVICE IDENTIFICATION AND REDIRECTION USING WHITELISTING TRAFFIC CLASSIFICATION

(71) Applicant: Ciena Corporation, Hanover, MD (US)

(72) Inventors: James P. Carnes, III, Baltimore, MD (US); David J. Krauss, Centreville, VA (US); Petar Djukic, Ottawa (CA); Todd Morris, Stittsville (CA)

(73) Assignee: Ciena Corporation, Hanover, MD (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/743,753

(22) Filed: May 13, 2022

(65) Prior Publication Data

US 2022/0272100 A1 Aug. 25, 2022

Related U.S. Application Data

(63) Continuation of application No. 16/523,397, filed on Jul. 26, 2019, now Pat. No. 11,363,031.

(60) Provisional application No. 62/723,161, filed on Aug. 27, 2018.

(51) Int. Cl.
*H04L 9/40* (2022.01)
*G06N 20/00* (2019.01)

(52) U.S. Cl.
CPC .......... *H04L 63/105* (2013.01); *H04L 63/101* (2013.01); *H04L 63/1416* (2013.01); *G06N 20/00* (2019.01)

(58) Field of Classification Search
CPC . H04L 63/105; H04L 63/101; H04L 63/1416; G06N 20/00; G06N 3/0454; G06N 3/0445; G06N 3/0472; G06N 3/08
USPC .......................................................... 726/22
See application file for complete search history.

(56) References Cited

U.S. PATENT DOCUMENTS

| | | | |
|---|---|---|---|
| 7,417,951 B2* | 8/2008 | An | H04L 47/12 370/231 |
| 8,145,560 B2* | 3/2012 | Kulkarni | G06Q 40/03 379/189 |
| 8,589,503 B2* | 11/2013 | Alperovitch | H04L 67/322 709/227 |
| 8,606,910 B2* | 12/2013 | Alperovitch | H04L 45/02 709/224 |
| 9,060,292 B2 | 6/2015 | Callard et al. | |
| 9,397,917 B2 | 7/2016 | Li et al. | |
| 9,432,257 B2 | 8/2016 | Li et al. | |
| 9,503,443 B2 | 11/2016 | Krauss et al. | |
| 9,819,565 B2 | 11/2017 | Djukic et al. | |
| 9,825,982 B1 | 11/2017 | Htay | |
| 9,838,248 B1* | 12/2017 | Grammel | H04L 41/0681 |

(Continued)

*Primary Examiner* — Badri Narayanan Champakesan
(74) *Attorney, Agent, or Firm* — Baratta Law PLLC; Lawrence A. Baratta, Jr.

(57) ABSTRACT

Systems and methods include monitoring packets, by a network edge device, from one or more endpoint devices where the packets are destined for corresponding application services in a network; classifying the one or more endpoint devices based on the monitoring into a corresponding trust level of a plurality of trust levels; and, responsive to a first endpoint device of the one or more endpoint devices being untrusted, steering the packets from the first endpoint device into a restricted zone.

19 Claims, 13 Drawing Sheets

(56) References Cited

U.S. PATENT DOCUMENTS

| | | | |
|---|---|---|---|
| 9,838,271 B2 | 12/2017 | Djukic et al. | |
| 9,838,272 B2 | 12/2017 | Djukic et al. | |
| 10,038,700 B1* | 7/2018 | Duchin | H04L 67/12 |
| 10,148,578 B2 | 12/2018 | Morris et al. | |
| 10,339,309 B1* | 7/2019 | Kling | G06F 16/9024 |
| 10,862,749 B1* | 12/2020 | Kiyak | H04L 41/147 |
| 11,049,039 B2* | 6/2021 | Zimmer | G06N 5/025 |
| 11,102,238 B2 | 8/2021 | Ackerman et al. | |
| 11,165,797 B2 | 11/2021 | Ackerman et al. | |
| 2012/0079592 A1* | 3/2012 | Pandrangi | H04L 63/0227 |
| | | | 709/224 |
| 2013/0198803 A1* | 8/2013 | Osterweil | H04L 63/20 |
| | | | 726/1 |
| 2013/0298192 A1* | 11/2013 | Kumar | H04L 63/1425 |
| | | | 726/25 |
| 2014/0244834 A1* | 8/2014 | Guedalia | H04W 4/21 |
| | | | 709/224 |
| 2014/0328256 A1 | 11/2014 | Djukic et al. | |
| 2016/0006753 A1* | 1/2016 | McDaid | H04W 4/70 |
| | | | 726/23 |
| 2016/0300227 A1 | 10/2016 | Subhedar et al. | |
| 2016/0381079 A1* | 12/2016 | Ben-Shalom | H04L 63/20 |
| | | | 726/29 |
| 2017/0019315 A1* | 1/2017 | Tapia | H04L 41/0631 |
| 2017/0230267 A1 | 8/2017 | Armolavicius et al. | |
| 2017/0353490 A1 | 12/2017 | Krauss et al. | |
| 2017/0374090 A1* | 12/2017 | McGrew | H04L 41/16 |
| 2018/0191743 A1* | 7/2018 | Reddy | G06N 20/00 |
| 2018/0212928 A1* | 7/2018 | Gerber | H04L 63/0209 |
| 2018/0225357 A1* | 8/2018 | Greco | G06V 10/98 |
| 2018/0285767 A1* | 10/2018 | Chew | G06N 20/00 |
| 2019/0141056 A1 | 5/2019 | Estabrooks et al. | |
| 2019/0362072 A1* | 11/2019 | Kesarwani | G06F 21/552 |
| 2020/0019821 A1* | 1/2020 | Baracaldo-Angel | G06K 9/6298 |
| 2020/0045069 A1* | 2/2020 | Nanda | H04L 63/1425 |
| 2020/0067935 A1* | 2/2020 | Carnes, III | H04L 63/101 |

* cited by examiner

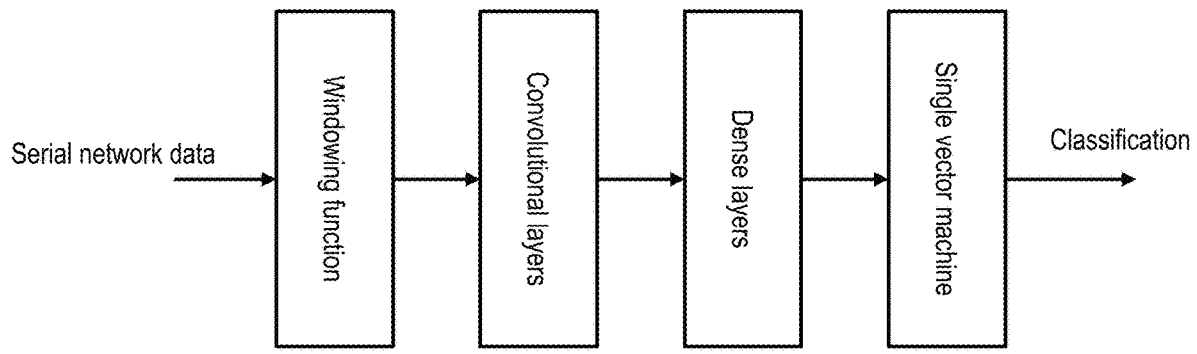

- Windowing function converts time-series into a 2-dimensional window
- Convolutional layers find major common characteristics
- Dense layers and the single vector machine find the boundary of the known trusted traffic

*FIG. 4*

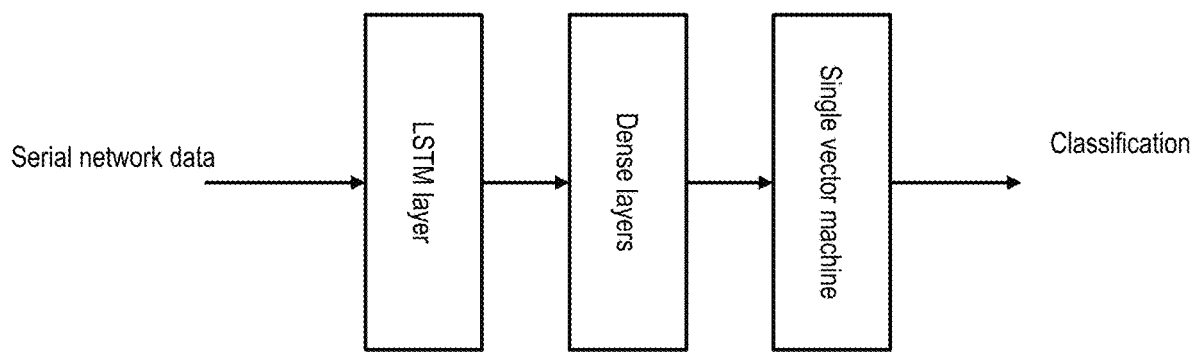

- LSTM layer treats time-series as time-dependent inputs to keep track of sequences of actions
- Convolutional layers find major common characteristics
- Dense layers and the single vector machine find the boundary of the known trusted traffic

*FIG. 5*

NETWORK ARCHITECTURE PROVIDING DEVICE IDENTIFICATION AND REDIRECTION USING WHITELISTING TRAFFIC CLASSIFICATION

CROSS-REFERENCE TO RELATED APPLICATION(S)

The present disclosure is a continuation of U.S. patent application Ser. No. 16/523,397, filed Jul. 26, 2019, and entitled "Network architecture providing device identification and redirection using whitelisting traffic classification," which claimed priority to U.S. Provisional Patent Application No. 62/723,161, filed Aug. 27, 2018, and entitled "Network architecture providing device identification and redirection using whitelisting traffic classification," the contents of each are incorporated by reference herein.

FIELD OF THE DISCLOSURE

The present disclosure generally relates to network security. More particularly, the present disclosure relates to a network architecture providing device identification and redirection using whitelisting traffic classification.

BACKGROUND OF THE DISCLOSURE

In today's environment, information security and network flows are treated as two separate functions with opposing goals. Security, as described herein, is achieved with devices designed to disrupt traffic flow (i.e., firewalls, routers with Access Control Lists (ACLs), intrusion prevention systems, etc.), which require rule setting and unless they are host-based, only control traffic in network segments where they are logically located. On the other hand, the network infrastructure is designed to connect and pass traffic as quickly and as efficiently as possible. The infrastructure is unaware and agnostic to the type and purpose of data it moves. Success criteria for network infrastructure is measured in uptime, throughput, and latency; security is simply not a consideration at the network layer; security requirements are conventionally satisfied through add on traffic disruption devices.

The conventional security infrastructure has the opposite goal. The purpose of security solutions is to inspect traffic, match for compliance, and restrict connectivity to pre-defined rulesets. The inspection processes reduce availability, increases latency, and creates bottlenecks for flows. In most instances, it is unaware of or agnostic to the purpose of the data, and in many cases that information is only available on a need-to-know basis by endpoint devices. Success criteria for network security solutions are typically evidenced in blocked connection attempts and disrupted network flows.

Conventional network and security solutions fail to adjudicate network end devices and application services for appropriate authorization and a need-to-know about the service. The existing approach is limited from a technology and business use case. Networks and data flows are simply too dynamic now to expect a manual rule management process on security devices to remain current. Attempts to automate rule creation require the security solutions to have context with regard to intended service requirements or use observed traffic to update the rule set, which creates overly permissive rules sets.

Technologies based on IEEE 802.1x attempt to authenticate and authorize endpoint devices prior to gaining access to network services. However, the implementation requires the endpoints to present a supplicant to begin authorization. Failure to present a supplicant denies access to the network. This process fails to scale effectively and has no support for entire classes of devices that cannot support the IEEE 802.1x agent or a certificate. Blacklists (blocking known bad) tend to be signature-based, which are static, typically publicly advertised, and bypassed by adversaries using simple evasion techniques. Small changes in attack tactics, techniques, and procedures will ensure the attack does not match the blacklist and thus will be allowed. The existing network infrastructure continues to pass traffic, unaware and unconcerned with the content.

Traditional network device vendors are measured based on performance and successful delivery of data. Security device vendors are measured on their ability to successfully block flows presumed to be attack flows. Again, these are fundamentally opposing goals.

BRIEF SUMMARY OF THE DISCLOSURE

In various embodiments, a method includes steps and a non-transitory computer-readable medium includes instructions that, when executed, cause a processor to perform the steps. The steps include monitoring packets, by a network edge device, from one or more endpoint devices where the packets are destined for corresponding application services in a network; classifying the one or more endpoint devices based on the monitoring into a corresponding trust level of a plurality of trust levels; and, responsive to a first endpoint device of the one or more endpoint devices being untrusted, steering the packets from the first endpoint device into a restricted zone. The steps can further include, responsive to a second endpoint device of the one or more endpoint devices being known bad, malicious, or compromised, performing any of quarantining the second endpoint device, honeypotting the second endpoint device, and disconnecting the second endpoint device. The restricted zone can be one of simulated in the network edge device and tunneled through the network to a part of the network used to evaluate untrusted devices. The steps can further include evaluating the first endpoint device in the restricted zone to determine if the first endpoint device is one of malicious, compromised, and legitimate. The restricted zone can be a forensic zone where traffic capture is enabled for evaluation of activity. The restricted zone can be is a remediation zone where devices access security services to remediate identified deficiencies in their configuration. The restricted zone can be is a rate-limited zone where traffic is allowed but slowed to allow for monitoring of adversary intent. The steps can further include continually monitoring the one or more endpoint devices, updating a corresponding trust level and rerouting based thereon. The classifying can be based on one or more trained machine learning models. The classifying can be based on at least one unsupervised machine learning model.

In an embodiment, a network edge device includes switching circuitry configured to switch traffic from one or more endpoint devices to corresponding application services over a network; and processing circuitry configured to monitor the traffic from the one or more endpoint devices, compare the monitored traffic to classify the one or more endpoint devices into a corresponding trust level of a plurality of trust levels, and route the traffic from each of the one or more endpoint devices based on its corresponding trust level. The traffic can be monitored through collection of one or more of network measurements and non-network measurements of each of the one or more endpoint devices. The network measurements can include any of timings and sizes of data packets, timings and headers of data packets, and timings and content of control packets, and the non-network measurements can include CPU, memory, and file system utilizations; host identifiers; operating system logs; classification may be done with labeled supervised, unlabeled supervised, or unsupervised machine learning. The network edge device can be configured to provide network connectivity to the one or more endpoint devices. For initial connectivity of an endpoint device, the endpoint device can be classified in a suspicious trust level and moved based on continuous monitoring. The one or more endpoint devices can be classified by comparing behavior relative to a group of similar types of devices. The processing circuitry can be configured to continually monitor the traffic from the one or more endpoint devices, update the corresponding trust level based thereon, and reroute the traffic based on an updated trust level. The network edge device can further include training circuitry configured to create the model. The training circuitry can utilize a one-class classifier that has suspicious/attacking traffic removed from a data set of training traffic.

In another embodiment, a non-transitory computer-readable medium includes instructions that, when executed, cause a processor to perform the steps of monitoring traffic from one or more endpoint devices destined for corresponding application services over a network; classifying, by comparing the monitored traffic, the one or more endpoint devices into a corresponding trust level of a plurality of trust levels; and causing routing of the traffic from each of the one or more endpoint devices based on its corresponding trust level. The monitoring traffic can include collecting one or more of network measurements and non-network measurements of each of the one or more endpoint devices. The network measurements can include any of timings and sizes of data packets, timings and headers of data packets, and timings and content of control packets, and the non-network measurements can include CPU, memory, and file system utilizations; host identifiers; operating system logs; classification may be done with labeled supervised, unlabeled supervised, or unsupervised machine learning. The monitoring, the classifying, and the causing can be performed by a network edge element that is configured to provide network connectivity to the one or more endpoint devices. For initial connectivity of an endpoint device, the endpoint device can be classified in a suspicious trust level and moved based on continuous monitoring. The one or more endpoint devices can be classified by comparing behavior relative to a group of similar types of devices. The non-transitory computer-readable medium can further include continually monitoring the traffic from the one or more endpoint devices, updating the corresponding trust level based thereon, and rerouting the traffic based on an updated trust level. The non-transitory computer-readable medium can further include performing training to create the model. The training can utilize a one-class classifier that has suspicious/attacking traffic removed from a data set of training traffic.

In a further embodiment, a method includes monitoring traffic, from one or more endpoint devices, destined for corresponding application services over a network; classifying, by comparing the monitored traffic, the one or more endpoint devices into a corresponding trust level of a plurality of trust levels; and causing routing of the traffic from each of the one or more endpoint devices based on its corresponding trust level. The monitoring traffic can include collecting one or more of network measurements and non-network measurements of each of the one or more endpoint devices.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 4 and 5 are diagrams of a one-class classifier based on deep learning;

DETAILED DESCRIPTION OF THE DISCLOSURE

Figure 1:
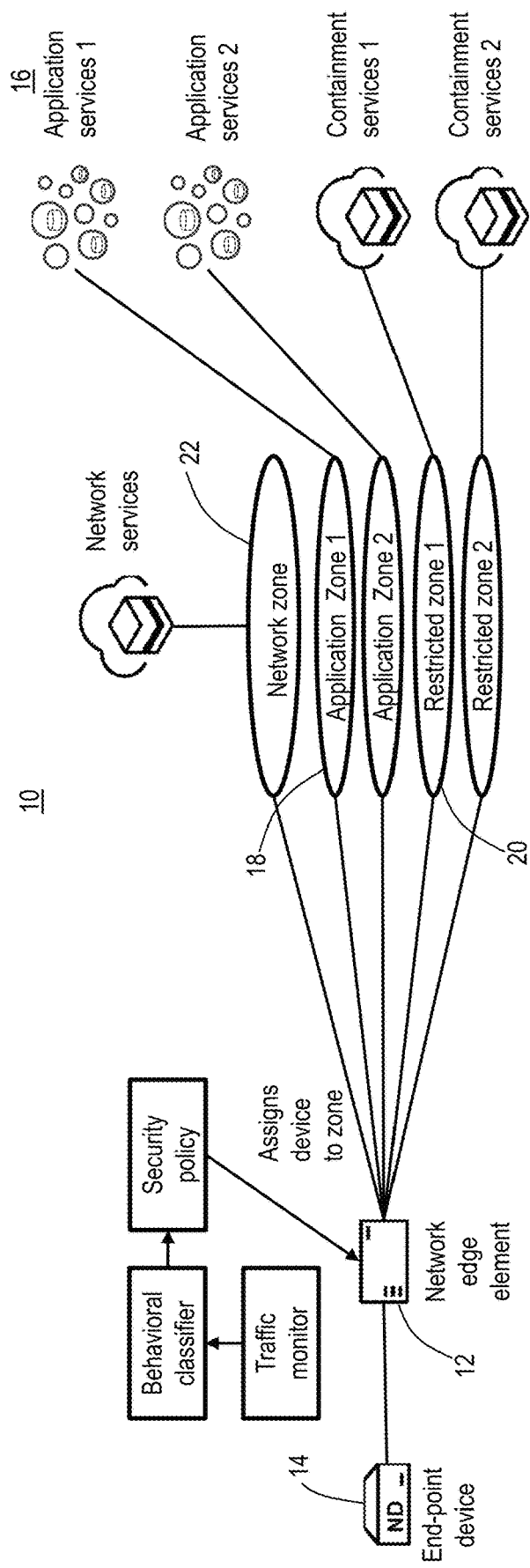
FIG. 1 is a network diagram of a security system in accordance with the network architecture; The traffic monitor, the behavior classifier, and Security policy are collectively known as the security controller.

The present disclosure relates to a network architecture providing device identification and redirection using whitelisting traffic classification. The network architecture includes a network-wide mechanism that works on network switches at the edge and is fully automated through the use of machine learning. Specifically, the present disclosure is based on whitelisting devices as opposed to the conventional approach of blacklisting devices. Also, the present disclosure utilizes a one-class classifier which removes the need to provide threat profiles or a threat database for training. Other approaches are also contemplated, based on on supervised machine learning implemented with deep neural networks such as convolutional neural networks, recurrent neural networks, or long-short term memory networks and unsupervised machine learning implemented with deep neural networks, such as autoencoders and generalized adveserial networks.

The network architecture includes processes that inspect and authorize network devices, track and categorize application services, and then use the network itself to route traffic based on continual validation of both endpoint and application services. If an application service is reclassified, the network is immediately aware of the change and flows from endpoint devices reach or fail to reach their destination based on their current identity, authorization, and need-to-know. There are no rules to update on security appliances or client devices to update. The network becomes the center for security and service enablement in the network architecture. This approach is highly disruptive to conventional business models of security and network flows with security being integral to the network flows.

The network architecture incorporates security at the network element layer, as opposed to an overlay solution. The network architecture uses machine learning to classify network devices and to re-route the traffic of that device to an isolated network domain upon detecting a threat, containing security counter-measures.

In an embodiment, a process includes classifying endpoint network devices into trusted and one or more categories of suspicious devices and re-routing network traffic of a device in a suspicious category into a corresponding isolated network domain. The process can include collecting network or non-network measurements of a network device, classifying the network device as either trusted or in one of the categories of a lower degree of trust, and upon detecting the network device is suspicious, re-routing traffic of the device into a corresponding isolated network domain. The endpoint network device may be any device with the ability to connect to a network such as a switch, router, end system, base station (eNB, gNB), wireless relay, wireless device (user equipment), sensor device, autonomous car, etc.; network measurements may include: timings and sizes of data packets, timings and headers of data packets, or timings and content of control packets; non-network measurements may include CPU, memory, and file system utilization, host identifiers or operating system logs; classification may be done with labeled supervised, unlabeled supervised, or unsupervised machine learning; traffic may be re-routed by changing flow-tables at edge or core network routers and switches; and isolated network domains may contain security counter-measures such as sinkholes or honeypots.

The classification process can be based on supervised learning approaches using pattern detection to classify suspicious devices. The classification process can be based on an unlabeled supervised machine learning such as the one-class classifier such as a pipeline of Convolutional Neural Network (CNN), Recurrent Neural Network (RNN), or Long Short-Term Memory (LSTM) neural network, followed by a support vector machine. The classification process can be based on a statistical unsupervised method for detecting outliers such as the kernel density estimator or principal component analysis. The classification process can be based on outlier detection using a neural-network-based autoencoder. The classifier can be continuously trained and upon discovery of a suspicious device re-trained excluding the traffic of the suspicious device. The classification process can be based on multiple classifiers connected in network corresponding to the network topology, protocol hierarchy, or both.

Traditional information security (INFOSEC) works by denying access to critical assets through add-on functionality, which includes network-based firewalls, intrusion prevention systems, host-based malware protection, proxy services, and the like. These approaches look for malicious activity matching known bad traffic and block it, known as blacklisting, or they require multiple rules to be implemented which specifically allow a data flow based on source/destination hosts and expected port and protocol.

The change in modern architectures to the cloud and the influx of Internet-enabled devices such as Internet of Things (IoT) make this traditional approach increasingly ineffective and unscalable. Virtualized Network Functions (VNFs) were the first attempt to address the problem. The ability to move virtual devices to multiple places quickly attempts to address the challenge of placing security devices in the appropriate location, but that technique fails to address the challenge of blacklist or rule management. Traditional network devices increasingly lose their effectiveness over time as the aggregated ruleset become overly permissive. Finally, they fail to address attack vectors that leverage allowed traffic patterns but with malicious intent; to include using an allowed protocol such as Domain Name System (DNS) to enter and leave a network but failing to recognize that the payload has been modified with malicious intent.

The industry recognizes this problem, and although significant research and work attempt to address this problem, the newer solutions are merely updated versions of the same paradigm. The network architecture radically changes the solution space; eliminates the need for separate security devices and integrates the security into the network infrastructure directly. A possible outcome of this solution is to eliminate the need for firewalls entirely.

Security System Description

FIG. 1 is a network diagram of a security system in a network 10 in accordance with the network architecture. Network security is enforced through the combination of actions by a network edge element 12 and the network 10. An example endpoint device 14 is connected to the network edge element 12. The endpoint device 14 is anything connected to the network 10, consuming services reachable with the network 10. Non-limiting examples of the endpoint device 14 can include a user computer, a tablet, a smartphone, a media streaming device, a wireless device, IoT device, an autonomous car, and the like.

The network edge element 12 can be a physical component such as Customer Premise Equipment (CPE), a wireless base station, a wireless relay element (e.g., mobile phone relaying traffic of a smart watch), a mobile edge compute device, a switch, a router, or a logical endpoint, if for example the endpoint device 14 is connected to cloud services using a Virtual Private Network (VPN).

The network 10 can also include application services 1, 2 16. Of note, system administrators, or an automated process, have associated devices with applications and applications with network application zones 18, 20, 22 (VPN or network slices). Devices use the network edge element 12 to connect to the application services 16. To connect to an application service 16, the device's traffic traverses an isolated network slice, associated with the one of the application zones 18, 20, 22. One application belongs to one application zone 18, but a device may belong in multiple application zones 18, 20, 22 if authorized to use multiple application services. Multiple devices may use the same network edge element 12 in, for example, the network edge element 12 connects a remote office to a central office, or the cloud (e.g., VPN concentrator). Multiple "devices" may also use an edge device 14, for example, if multiple devices/control applications are using a hot-spot in an autonomous car.

The proposed mechanism in this network architecture addresses the shortcomings of current approaches in multiple ways:

It is based on whitelisting of devices 14, which avoids the trap of attackers learning which types of flow signatures are blacklisted and to be avoided. Any new flow signature is marked as suspicious until allowed, in the network zone 22.

It is fully automated through the use of machine learning to recognize when, with almost no human intervention required to add new bad devices 14.

It is a part of the network 10 while remaining backward compatible with current network standards. This avoids replacing old equipment and avoids the need for security-specific devices such as firewalls.

The network architecture has an approach that fundamentally changes how the network 10 performs security. It is based on whitelisting devices 14, as opposed to blacklisting devices 14 (with firewalls). On top of this, the network architecture includes an Artificial Intelligence (AI) approach based on machine learning.

Network Device from the Network Security Point of View

The endpoint device 14 connects to the network 10 in multiple steps and transitions multiple states from the point of view of the network 10. Initially, the endpoint device 14 is disconnected. It connects to the network 10 and is automatically joined to the network zone 22. At this stage, the endpoint device 14 recognizes network services are potentially available and begins announcing its presence and auto-discovers network services. All devices 14 begin in an untrusted state and progressively increase or decrease their trust level based on passive monitoring of the device 14. The network 10 may monitor timings and sizes of data packets, timings and header content of data packets, timings, and content of control packets, or monitor higher-level headers and packet data with deep packet inspection.

If the device 14 fails the assessment process and is evaluated as untrusted (suspicious), its traffic is steered into one of the restricted zones 20. Restricted zones 20 are tailorable and based on each individual organization's risk policy. Zones could include: a sinkhole zone where traffic is simply dropped; a forensic zone where traffic capture is enabled for evaluation of activity; a remediation zone where devices access security services to remediate identified deficiencies in their configuration; the rate-limited zone where traffic is allowed but slowed to allow for monitoring of adversary intent.

Figure 9:
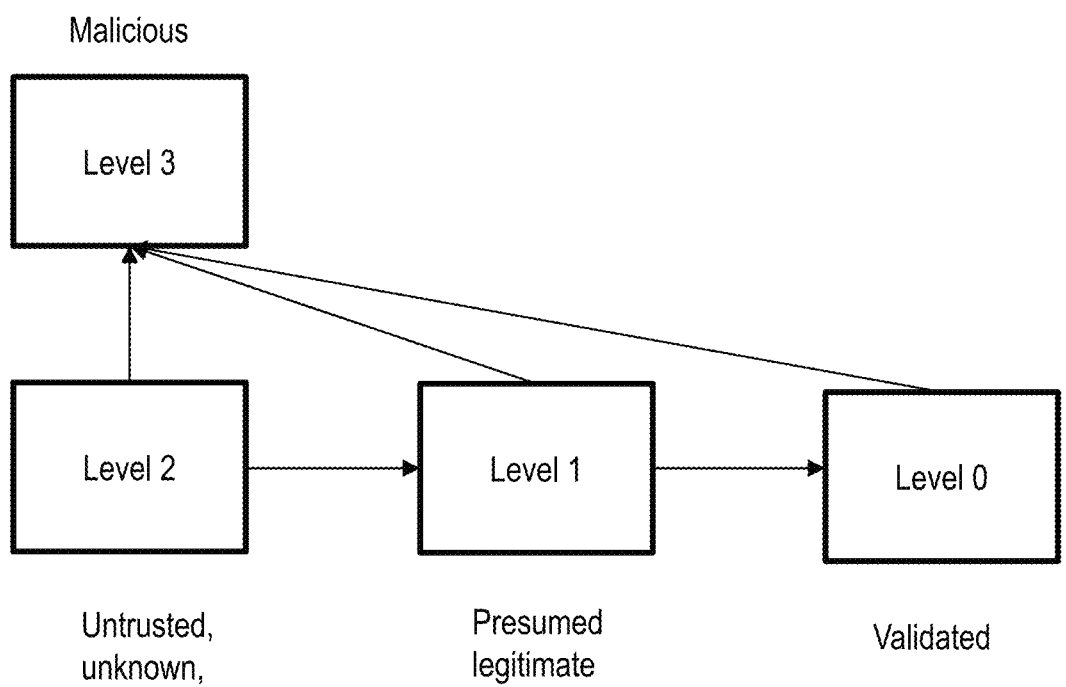
FIG. 9 is a state diagram illustrating the levels of trust.

The process works by identifying, authenticating, and authorizing end-point devices through passively collected observables and altering network access based on the level of trust identified. For example, the following levels of thrust may be used (FIG. 9 is a state diagram illustrating the levels of trust):

Level 3—End-point device 14 is known bad, malicious, or compromised—immediately placed in quarantine, a honeynet, or disconnected. The embodiments in this document show how the device is classified as malicious.

Level 2—End-point 14 is untrusted, unknown. The device 25 may start in this stage when it initially joins the network, and the network has not identified or authenticated it yet. Network services and resources (DNS, DHCP etc.) are simulated in order to prompt the endpoint to generate data for classification. The network may be simulated by the network edge device, or the untrusted end-point's traffic may be tunneled (encrypted) through the network to a part of the network used evaluate untrusted devices.

Level 1—End-point 14 device is presumed legitimate. The network 10 has done the initial validation of endpoint identity—its passive observables match what the network 10 knows and expects—combination of Media Access Control (MAC), Internet Protocol (IP), HOSTNAME, Dynamic Host Configuration Protocol (DHCP), Transmission Control Protocol (TCP), Hypertext Transport Protocol (HTTP) Agent strings, etc.

Level 0—End-point device 14 is interrogated and validated—credentialed validation of device configuration for full validation by security agent (could be network element capability, an existing security product, or infrastructure resources).

Embodiments shown here use machine learning to continually observe the behavior of Level 0 and Level 2 devices and to reinforce and strengthen initial validation of Level 1 devices for faster, more accurate presumptions. Machine learning automates the decision of classifying the Level 0 or Level 1 as a Level 3 device.

Establishing Trust at the Network Edge

Comparing to the current solutions using firewalls, trust for a device 14 is established by the edge network element 12. This eliminates the need for costly and complex systems requiring placement and management of firewalls to match the device 14 location. Note that the trust is "logically" established at the edge network element 12. Network trust can be established at the network element itself or with the assistance of an external network service.

Fingerprinting

Figure 2:
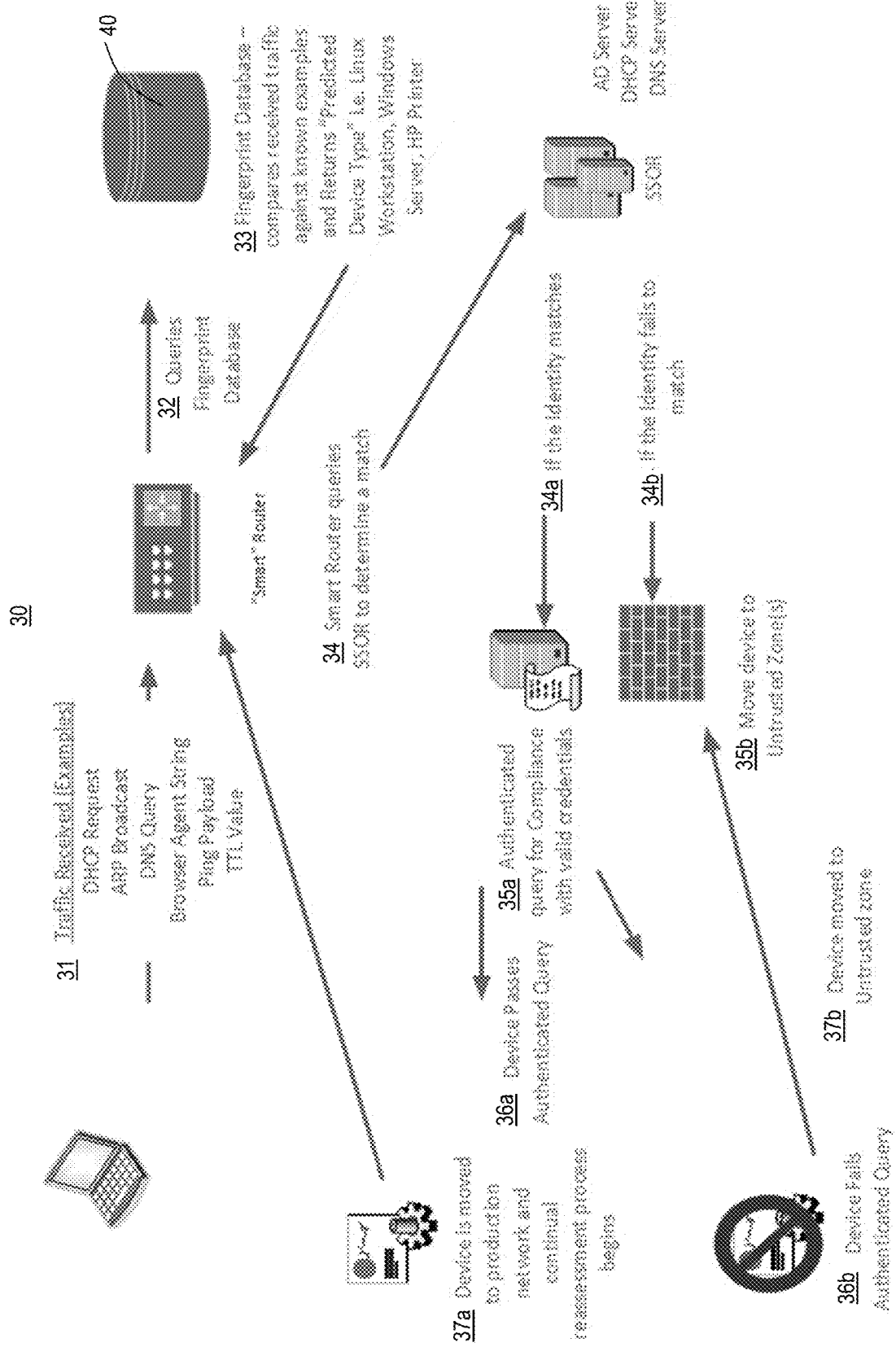
FIG. 2 is a block diagram of a system based on fingerprinting to establish trust.

FIG. 2 is a block diagram of a process 40 for fingerprinting to establish the trust of a device 14. One way to establish trust is to use a network fingerprint database to compare network device 14 behavior to what is generally expected behavior by the network device 14 of that type. The network edge element 12 monitors the device's 14 behavior and begins a trust level assignment. Through established passive fingerprinting technology and querying of authorized source systems of record, the device 14 will be assigned a trust level. If the device 14 is evaluated and is trusted, it will be assigned to the appropriate application zone 18, 20, 22. All traffic from the device 14 will be tagged based on the appropriate zone assignments. The network edge element 12 will then begin a continual reassessment of the device 14 to ensure continued application access is warranted.

The process 30 includes receiving traffic from a device 14 (step 31). For example, the traffic can be anything—a DHCP request, an Address Resolution Protocol (ARP) broadcast, a Domain Name System (DNS) query, a browser agent string, a ping payload, a Time to Live (TTL) value, etc. The network edge element 12 is a "smart" device and can be configured to query a fingerprint database 40 (step 32). The fingerprint database 40 compares received traffic against known examples and returns a "predicted device type," e.g., Linux workstation, Windows server, printer, etc. (step 33). The network edge element 12 can query a Source System of Record (SSOR) to determine a match of the fingerprint (step 34). For example, the SSOR can be an Active Directory (AD) server, a DHCP server, a DNS server, etc.

If there is a match (step 34a), the network edge element 12 can perform an authenticated query for compliance with valid credentials (step 35a). If there is not a match (step 34b), the device 14 can be moved to an untrusted zone 20, 22 (step 35b). If the device 14 passes the authenticated query (step 36a), the device can be moved to the application zones 16 along with a continual reassessment process (step 37a). If the device fails the authenticated query (step 36b), the device 14 can be moved to an untrusted zone 20, 22 (step 37b, 35b).

Another way, which is more adaptive, is to learn trusted network behavior by the network 10 with a machine learning classifier.

Trust Classification with Machine Learning

Another technique to establish trust is to combine the static passive fingerprint technique as a baseline classification of the endpoint device 14 and then use the adaptive machine learning classifier to more quickly learn and classify the endpoint device 14.

The solution enables the capability to begin with static fingerprinting, move to a machine learning approach, and then combine the two together for a faster, more accurate classification process. This can be used with the network architecture to determine how network flows are routed to the endpoint device 14.

Adaptive Trust Learning and Monitoring

Figure 3:
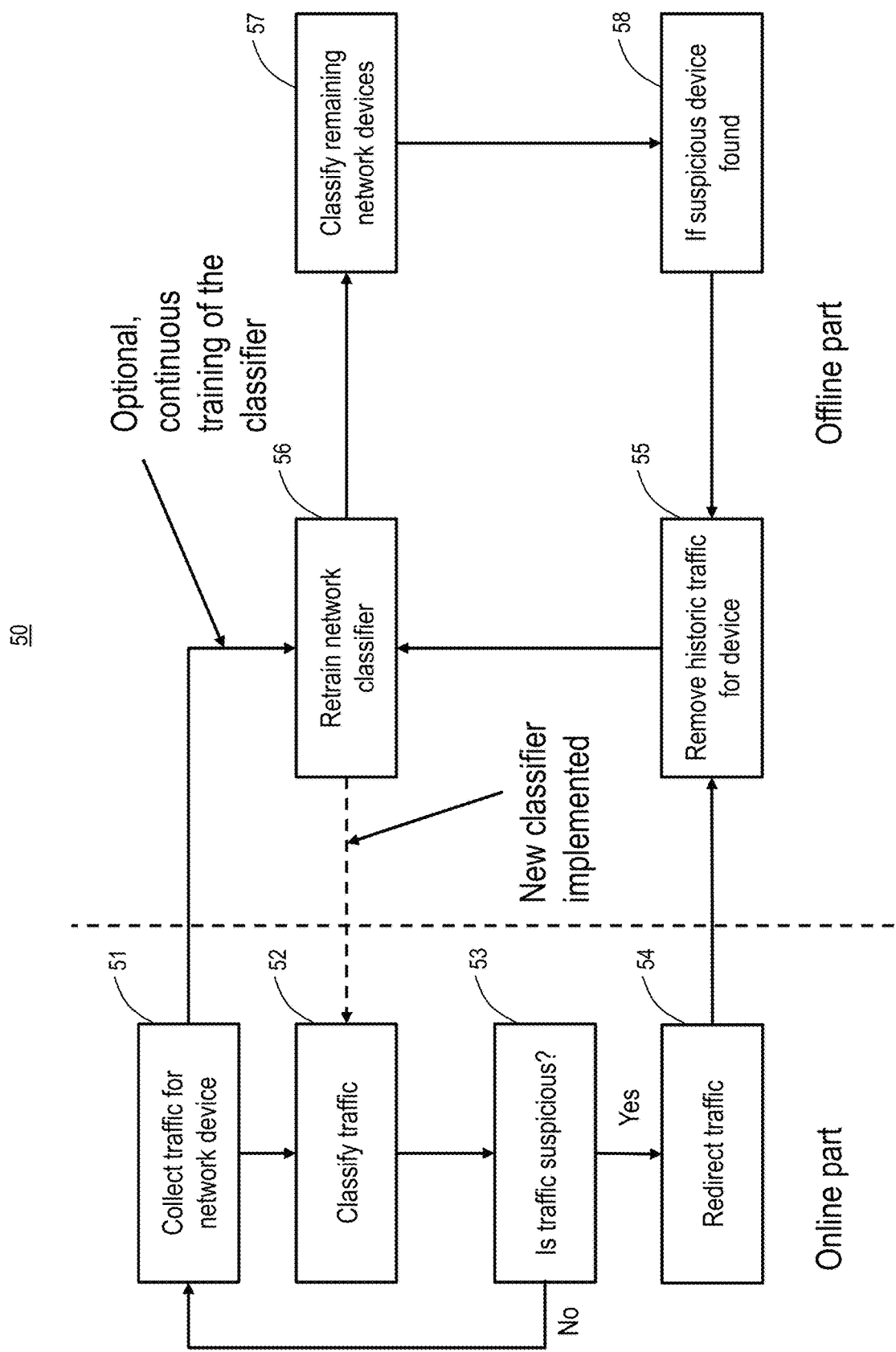
FIG. 3 is a flowchart of a classification process using the network architecture.

FIG. 3 is a flowchart of a classification process 50 using the network architecture. The network 10, via the network edge element 12, is constantly monitoring the behavior of the network devices 14 for the purposes of classifying them as "trusted" or "suspicious." An online portion of the classification is shown on the left side in steps 51-54. It continuously monitors the traffic out of the network device 14 (step 51) and classifies the traffic as "trusted" and "suspicious" (step 52). The classification of the device is performed with a "network traffic classifier," which may be based on machine learning technology. The classifier may be constantly trained with the observed device behavior, or it could have been trained and delivered to the place where its classification is done.

If the device is found to be suspicious (step 53), it is redirected to one of the restricted zones 20 (step 54). For the purposes of the classification, it may be necessary to retrain the network classifier without the historical information obtained from the now suspicious network device (step 56), as shown in the offline part on the right side. Also, if the network classifier is changed due to the removal of the historical records about the device 14 (step 55), the historical records of other network devices 14 are checked to ensure they did not become suspicious upon the removal of the network device's 14 information from the classifier (steps 57, 58).

Devices 14 that are suspicious can be redirected, or steered, to one of the restricted zones 20 in several ways. The basic idea is to alter the path of the flow away from its intended destination. This can be achieved by several techniques including Access Control Lists (ACLs), programmable data plane techniques (like OpenFlow route table setting, P4 route table setting, or any other programmable language that allows one to change the criteria of the forwading plane), Command Line Interface (CLI) scripts.

ACLs can filter traffic and decide whether to forward the traffic or drop the traffic. In some cases, ACL's can use rudimentary match criteria in the header of Layer 2 and Layer 3 packets, and based on those matches can alter the path of the traffic by changing where the packets are forwarded.

OpenFlow provides a more general approach of matching fields in packet headers and then performing an action based on the match. In this sense, any field in the header can be used as matching criteria, and part of the action may be to alter those fields before forwarding the packet.

P4 is a programming language that allows matching on any generic bit pattern within a packet header. With P4, the match criteria are not limited to fields in the header defined by any specific protocol. In addition, P4 has the ability to add metadata into packet headers, which can be used to tag packets and flows with information determined in the classifying stage. The forwarding of any packet or flow can be altered, but the action that is determined, and that action can key off the metadata as well. When the packet is arriving at its destination (the redirected destination), the metadata can be stripped from the packet.

Based on the traffic classification, a Software Defined Networking (SDN)-based controller can use scripts to log on to network devices and change the configuration of the device to redirect traffic. This can be done by creating ACLs, tunnels, VPNs or by modifying the routing protocols of the device, i.e., the Open Shortest Path First (OSPF), Intermediate System-Intermediate System (IS-IS) or Border Gateway Protocol (BGP) configuration. In addition to scripts that directly access the CLI of a network device, there is also the approach that uses configuration-based Application Programming Interfaces (APIs) (like NETCONF) to change the configuration, modify the protocol behavior and ultimately redirect the traffic. Also, Representational State Transfer (REST) calls can be used to a Network Management System (NMS), REST calls to an automation platform (or REST calls to network devices).

Types of Attacks on Devices

Some example attacks on the devices 14, which can alter the observed behavior and subsequent trust level include:
- Restarting a Windows system with an attack distribution of Linux
- Replacing the operating system of an IoT device with a custom Linux ROM
- Having a DNS request from a print device include payload data that is different than normal requests.
- If the Time-To-Live (TTL) value, Media Access Control (MAC) address, Dynamic Host Configuration Protocol (DHCP) request format, and hostname all point to a Linux device but the Source system of record knows the MAC and hostname to be a Printer, it is possible the device has been compromised or behaving in a manner inconsistent with the established baseline and thus is untrusted.

Examples of passive fingerprinting techniques include:
uniquemachine.org/
fingerbank.org/
www.augur.io/#deviceFeatures
old.honeynet.org/papers/finger/
old.honeynet.org/papers/finger/traces.txt
www.darkwavetech.com/device_fingerprint.html Types of Data Collected to Detect Attacks Passive network behavior is possible due to vendor implementation differences. For example:
- Windows XP orders ping packet sequence numbers in host byte order whereas other versions of operating systems order by network byte.
- Windows will include repeating sequences of A-W in the ICMP payload whereas Linux will include a byte count from 0 to 255
- Default TTL values differ based on operating system and application, AIX uses a default value of 60 for TCP, 30 for UDP and 255 for Internet Control Message Protocol (ICMP), Cisco devices uses 254 for ICMP, Linux uses either 64 or 255 based on kernel version and Windows uses 32 or 128 depending upon OS version.
- Collected hostname and MAC address are additional examples to help passively identify a device.
- The order in which a DHCP client requests asks for options including DNS server and default gateway can differentiate OS versions.
- The network may use a sniffer to collect traffic traces and then use deep packet inspection (DPI) to isolate protocol headers and present those to the network traffic classifier.

By collecting and combining the information the device is providing in an unsolicited manner, the network 10 can collect the information and with a reasonable level of certainty determine the class of an object and potentially the unique ID of the object. This information can then be used to query the expected ID of the device for compliance.

Classification of Network Devices with Machine Learning

Trusted network behavior can be learned in several ways with machine learning.

An unsupervised learning algorithm can be used to model the behavior of the network device 14 with statistical means (kernel density estimation, principal component analysis, generative adversarial network). A more advanced approach may employ an auto-encoder to model the behavior of network devices 14. The problem with these unsupervised approaches is that they assume that only a few of the devices 14 may act suspiciously—the outliers. It will find some suspicious devices 14 even if all network devices 14 should be trusted; it will also only find a few suspicious devices even if all network devices 14 are suspicious.

A supervised machine learning algorithm can be trained to recognize trusted and suspicious behavior. Labels are created in a manual fashion by looking over historical data and labeling each time period as trusted or suspicions. This approach is costly and does not scale. There may only be a few instances where the traffic was suspicious making the training data set heavily unbalanced.

A better way is to use a one-class classifier supervised learning approach (P. Perera, V. M. Patel, "Learning Deep Features of One-Class Classification," Computer and Pattern Recognition, Submitted 2018, arxiv.org/abs/1801.05365). In the one-class classifier approach, a supervised learning algorithm is trained with only "trusted" labels. It then detects if a device 14 does not behave as predicted by the trusted labels. It is well-known that this approach works much better than unsupervised algorithms and that it is fully automated, compared to the supervised learning approach. This is our preferred way to classify network devices into trusted and suspicious network devices 14.

FIGS. 4 and 5 are diagrams of a one-class classifier based on deep learning. In FIG. 4, a windowing function converts time-series into a 2-dimensional window, convolutional layers find major common characteristics, and dense layers and the single vector machine find the boundary of the known trusted traffic.

In FIG. 5, an LSTM layer treats time-series as time-dependent inputs to keep track of sequences of actions, convolutional layers find major common characteristics, and dense layers and the single vector machine find the boundary of the known trusted traffic. Another way to accomplish a similar effect is to use the RNN layer as the first layer.

Recognizing Suspicious Behavior

The mechanism for recognizing suspicious behavior works by recognizing that a device 14 is not following a protocol in its expected way. Network protocols are essentially dialogues between machines, so the machine learning algorithms learn this language and are able to recognize deviations (i.e., accents). Natural language processing machine learning algorithms can be used for this purpose. For example, RNN-based deep learning is a good candidate. Observed protocol data can be first tokenized and then processed with skip-gram or continuous bag-of-words techniques.

Control Loop

Figure 6:
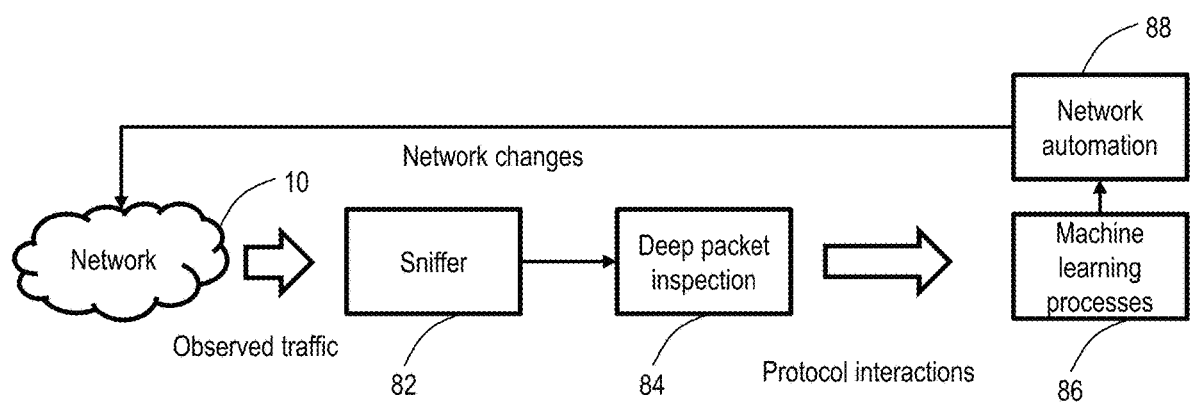
FIG. 6 is a diagram of a control loop in the network architecture.

FIG. 6 is a diagram of a control loop 80 in the network architecture. The network 10 can be observed through a sniffer 82 which can be the network edge element 12, an inline monitoring device, etc. The sniffer can pass data to Deep Packet Inspection (DPI) 84. The DPI isolates protocol interactions associated with addresses and passes it to machine learning processes 86. The machine learning processes 86 categorize the network and set indications to network automation 88, which in turn uses operator policies to re-direct traffic or otherwise.

Training

Figure 7:
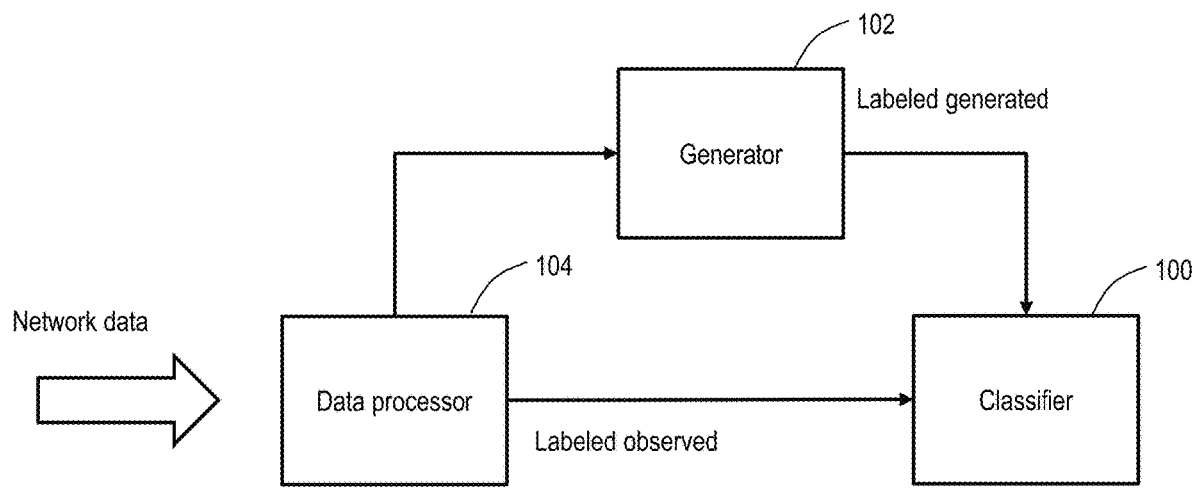
FIG. 7 is a diagram of training a deep learning one-class classifier.
Figure 8:
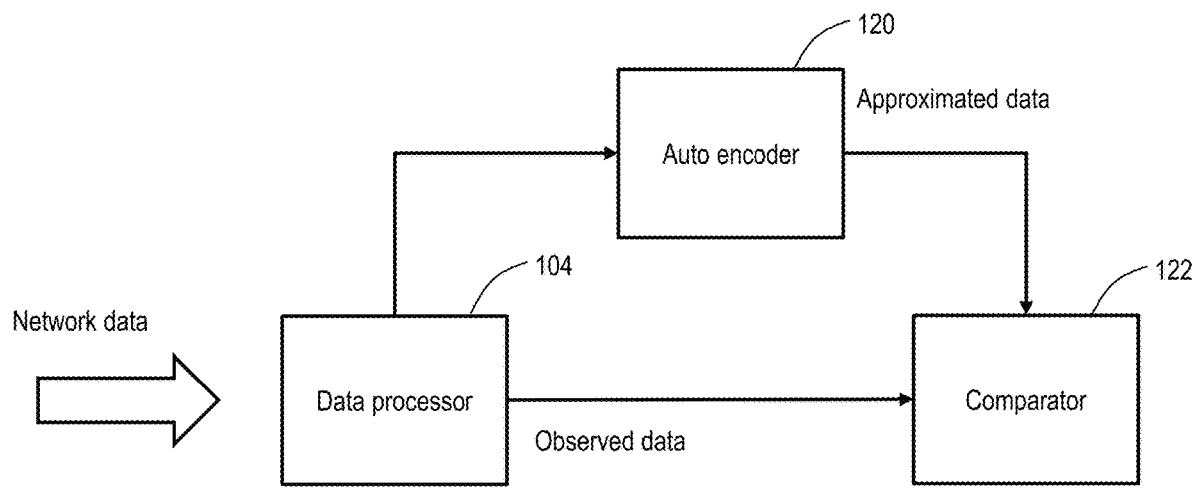
FIG. 8 is a diagram of training a one-class classifier with an autoencoder.

FIG. 7 is a diagram of training a deep learning one-class classifier 100. The system trains two deep neural networks. A generator network 102 is trained to generate data statistically similar to observed data 104 (this could be implemented as a Generalized Adversarial Network (GAN) or an autoencoder. The second network is trained to discriminate observed data from generated data. During inference, the second network is used to detect "normal" observed data; the generated data is not searched for as it does not exist in the field data. All data which is not recognized as normal is reported as suspicious. The classifier could be trained to have a very high probability of true positive rate. For example, see P. Perera, V. M. Patel, Learning Deep Features for One-Class Classification, arxiv.org/pdf/1801.05365.pdf M. Kliger, S. Fleishman, Novelty detection with GAN, arxiv.org/pdf/1802.10560.pdf K. Hempstalk, E. Frank, H. Witten, One-class Classification by Combining Density and Class Probability Estimation FIG. 8 is a diagram of training a one-class classifier with an autoencoder 120. The autoencoder 120 is trained to find the closest approximation to the observed data 104. During inference, the autoencoder 120 is used to find the approximation of the input data, and that approximation is compared 122 to the observed data to find their difference. If the difference crosses a threshold, data is marked as suspicious. The difference could be found with, for example, mean square error (MSE), or other techniques comparing vectors (L0, L1 distance metrics).

It may be advantageous to train the classifier to each device type. In this case, it is required that each device type be identified during the collection of the network traffic and that its network traffic be transmitted for machine learning to its classifier. The device types can be identified through a data which is based on existing network devices (e.g., maintained by IT by connecting port, or MAC address), or by parsing its MAC address and then using a generally available manufactures database of MAC addresses.

Conventional Approach—Blacklisting Based on Traffic Signatures

Figure 10:
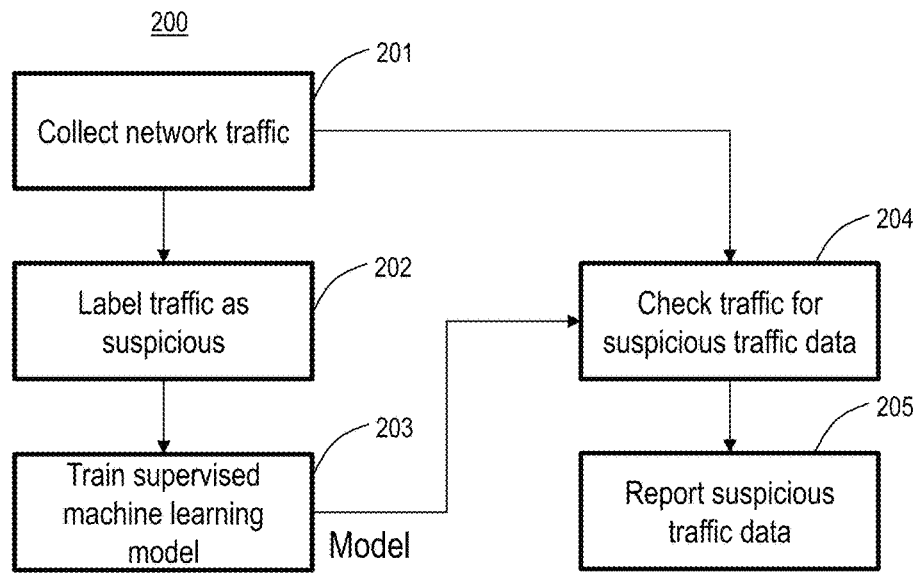
FIG. 10 is a flowchart of a blacklisting process based on traffic signatures.

FIG. 10 is a flowchart of a blacklisting process 200 based on traffic signatures. The blacklisting process 200 collects network traffic (step 201), labels traffic as suspicious as appropriate (step 202), and trains a supervised machine learning model (step 203). Once trained, the collected network traffic (step 201) is checked for suspicious traffic (step 204), and suspicious traffic is reported as appropriate (step 205). The blacklisting process 200 uses supervised machine learning which is trained to detect the pattern of an attack—if a pattern is detected, the device or connection is blacklisted. An essential part of this blacklisting process 200 is that a security expert examines network traces and labels suspicious traffic. This is time-consuming (expensive) and prone to errors and supervised learning recognize the signature of the attack and can be fooled by a modified attack signature. This approach does not allow gradual classification of devices—they are either suspicious or not.

Figure 11:
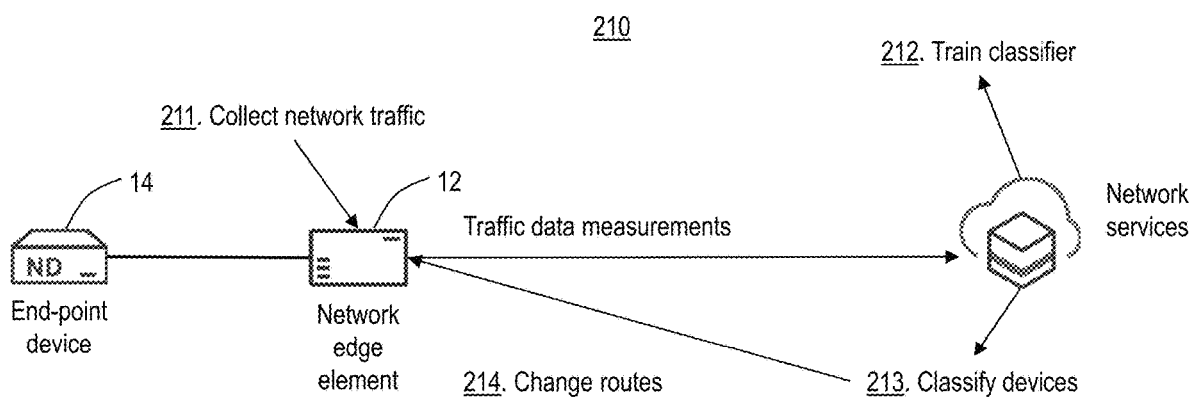
FIG. 11 is a network diagram of off-device training and classification.

FIG. 11 is a network diagram of off-device training and classification. An off device training and classification 210 includes collecting network traffic (step 211), training a classifier with traffic data measurements (step 212), classifying devices (step 213), and changing routes (step 214). The classification and training are done off the device, the network edge element 12. The network edge element 12 collects data, and its forwarding tables can be changed to re-route traffic into different zones. This technique works well for supervised training because labeling has to be done off of the network edge element 12.

Whitelisting Processes

Figure 12:
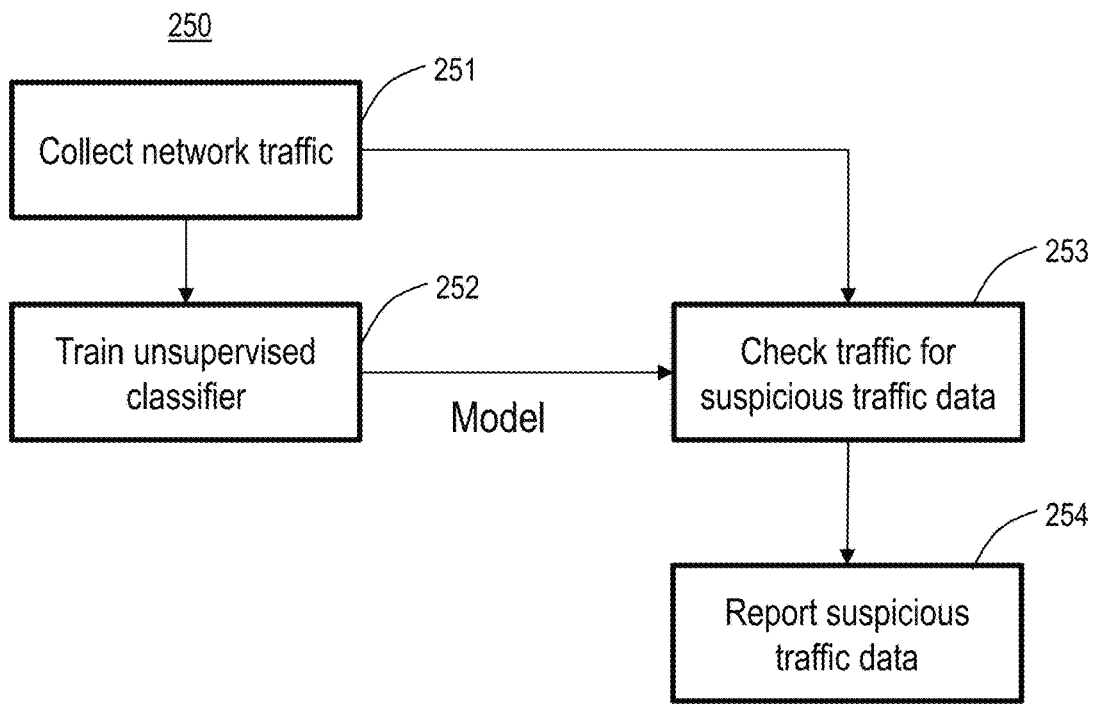
FIG. 12 is a whitelisting process based on outlier device behavior.

FIG. 12 is a whitelisting process 250 based on outlier device behavior. The whitelisting process 250 includes collecting network traffic (step 251) and training an unsupervised classifier (step 252). Once the model is trained, the collected network traffic (step 251) is checked for suspicious traffic data (step 253), and suspicious traffic is reported as appropriate (step 254). The unsupervised learning does not require labels as it does not learn the pattern of the attack. Traffic is whitelisted, meaning that it is accepted into the network, until it becomes suspicious. Unsupervised learning works by fitting a machine learning model to fit the probability distribution of traffic. An attack is statistically different from normal traffic, so it is detected.

Suspicious behavior is detected when the probability of observed traffic is low in the distribution of previously observed traffic. For example, unusually large Simple Mail Transfer Protocol (SMTP) packet, TCP packet sequence with unusual size fields, TCP handshake with unusual timings, etc. Examples of unsupervised machine learning techniques include Kernel Density Estimate (KDE), Principle Component Analysis (PCA), GAN generator, Autoencoder, etc. As unsupervised learning does not require labels, training can be done on the edge device 12. If the device lacks the compute power for training, training may be offloaded into the cloud.

Figure 13:
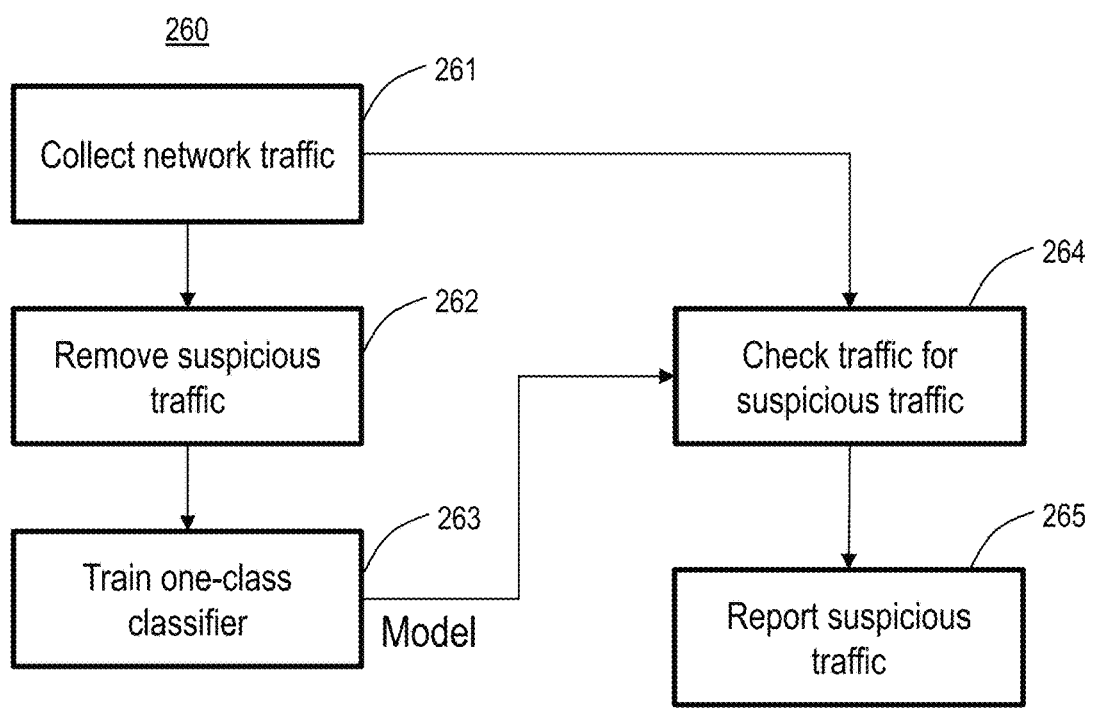
FIG. 13 is a whitelisting process based on non-normal device behavior.

FIG. 13 is a whitelisting process 260 based on non-normal device behavior. The whitelisting process 260 includes collecting network traffic (step 261), removing suspicious traffic from the collected network traffic (step 262), and training a one-class classifier (step 263). Once the model is trained, the collected network traffic (step 261) is checked for suspicious traffic data (step 264), and suspicious traffic is reported as appropriate (step 265).

The one-class classifiers are binary classifiers trained to discriminate traffic which does not follow "normal" behavior. Traffic is whitelisted, meaning that it is accepted into the network 10, until it becomes suspicious. Training a one-class classifiers require a manual process to remove suspicious/attacking traffic. Note that it is much easier to remove attacking traffic when it is known that attack has happened then to label the traffic at each point it was collected as suspicious or normal. Even if too much of the "good" traffic has been removed, the classifier will be trainable. The attack is statistically different from normal traffic, so it is detected. The manual process could be done off-line after an attack to remove the traffic of the attacker (which is now suspicious).

Examples of one-class classifiers machine learning techniques include a GAN discriminator, a Random Forrest with randomly generated data as suspicious input, etc. As one-class classifier learning does not require labels, training can be done on the edge device 12. The device needs to be told which devices/traffic is now suspicious and to retrain the classifier without those inputs. If the device lacks the compute power for training, training may be offloaded into the cloud.

Figure 14:
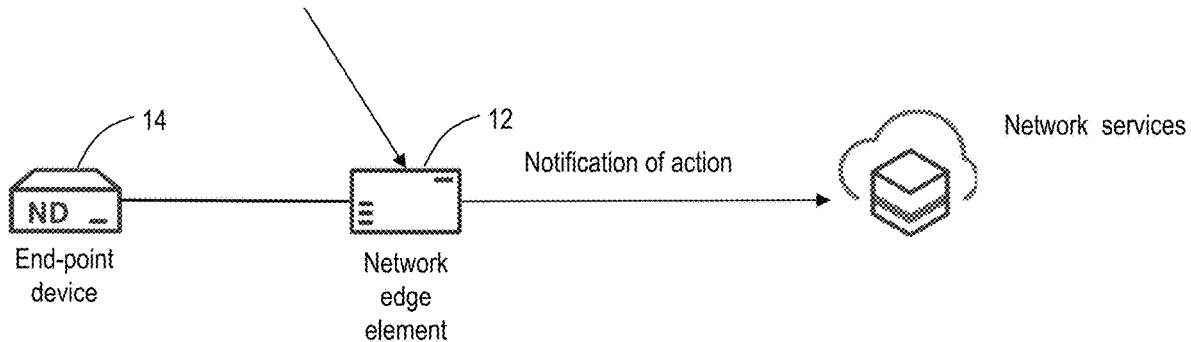
FIG. 14 is a network diagram of on-device training and classification.

FIG. 14 is a network diagram of on-device training and classification. A process 270 includes collecting network traffic (step 271), training a classifier (step 272), classifying devices (step 273), and changing routes accordingly (step 274). The process 270 is fully implemented on the device 12. This technique works because the device 12 uses unsupervised learning. The advantage of this process 270 is reduced network traffic and reduced load on the central cloud for data processing and model training.

Figure 15:
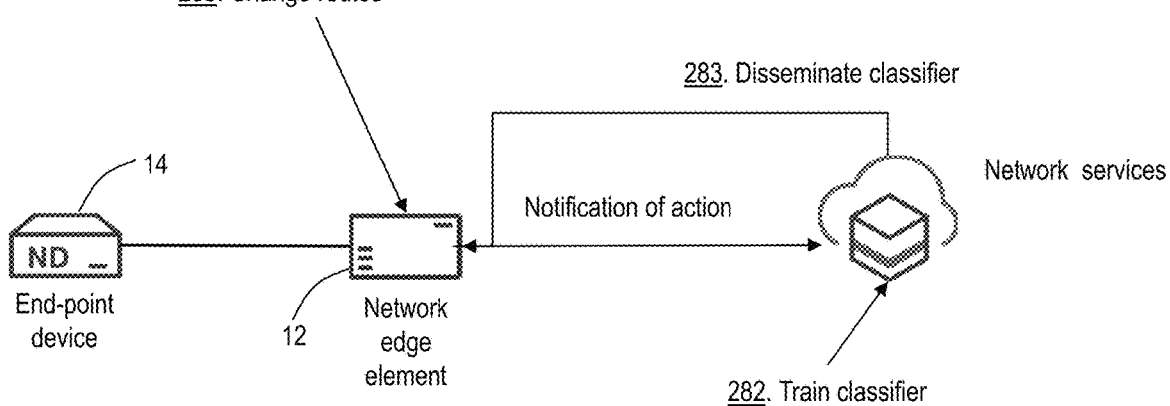
FIG. 15 is a network diagram of on-device classification and off device training.

FIG. 15 is a network diagram of on-device classification and off device training. A process 280 includes collecting network traffic (step 281), training a classifier off the device 12 (step 282), disseminating the classifier to the device 12 (step 283), classifying devices (step 284), and changing routes accordingly (step 285). The advantage here is that the more data is available for training and from more devices. For example, ensemble learning can be used to combine classifiers from multiple devices of the same type to detect supply chain attacks. This technique can use supervised or unsupervised learning.

Detection Inaccuracies

There can be various detection inaccuracies, namely attacking devices 14 not flagged as suspicious (false negatives) and normal end-points flagged as suspicious (false positives). For false negative, this is similar to the situation today, which does not include automatic classification. There can be an outside system for forensic analysis of network traffic when the attack is eventually detected. The traffic of the attacker is removed from the training sets after the attack is found so that future attacks like that will be detected with higher probability.

For false positives, a network device will be removed from the services it requires. A separate mechanism can be used to detect when the device is not serving its intended purpose (irate customer call, an alarm from the device's users). If the device was flagged because its behavior is new to the classifier, data set re-balancing techniques could be used. The device's traffic could be added multiple times to the training of the classifier to increase the likelihood of it looking normal to the classifier. The traffic of other devices could be sampled down to reduce their probability. Other techniques are listed in Guillaume Lemaître, Fernando Nogueira, and Christos K. Aridas. 2017. Imbalanced-learn: a python toolbox to tackle the curse of imbalanced datasets in machine learning. J. Mach. Learn. Res. 18, 1 (January 2017), 559-563, the contents of which are incorporated by reference herein.

Figure 16:
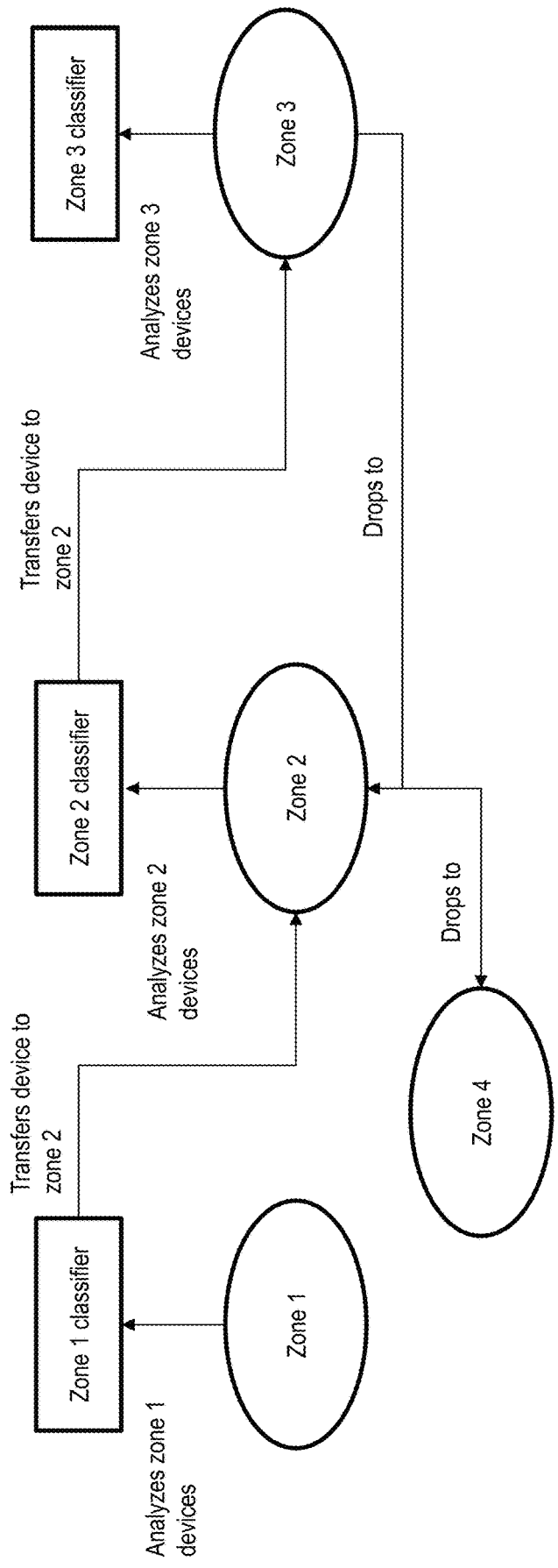
FIG. 16 is a state diagram of example zone transitions.

FIG. 16 is a state diagram of example zone transitions. Zone's implicitly establish different levels of trust. Suspicious behavior in one zone may not be suspicious in another zone. A different classifier is used to classify behavior as suspicious in each zone. Note that the path through the set of zones may not be linear—Zone 4 could be a honeypot zone, not the zone the device starts in (Zone 1).

Figure 17:
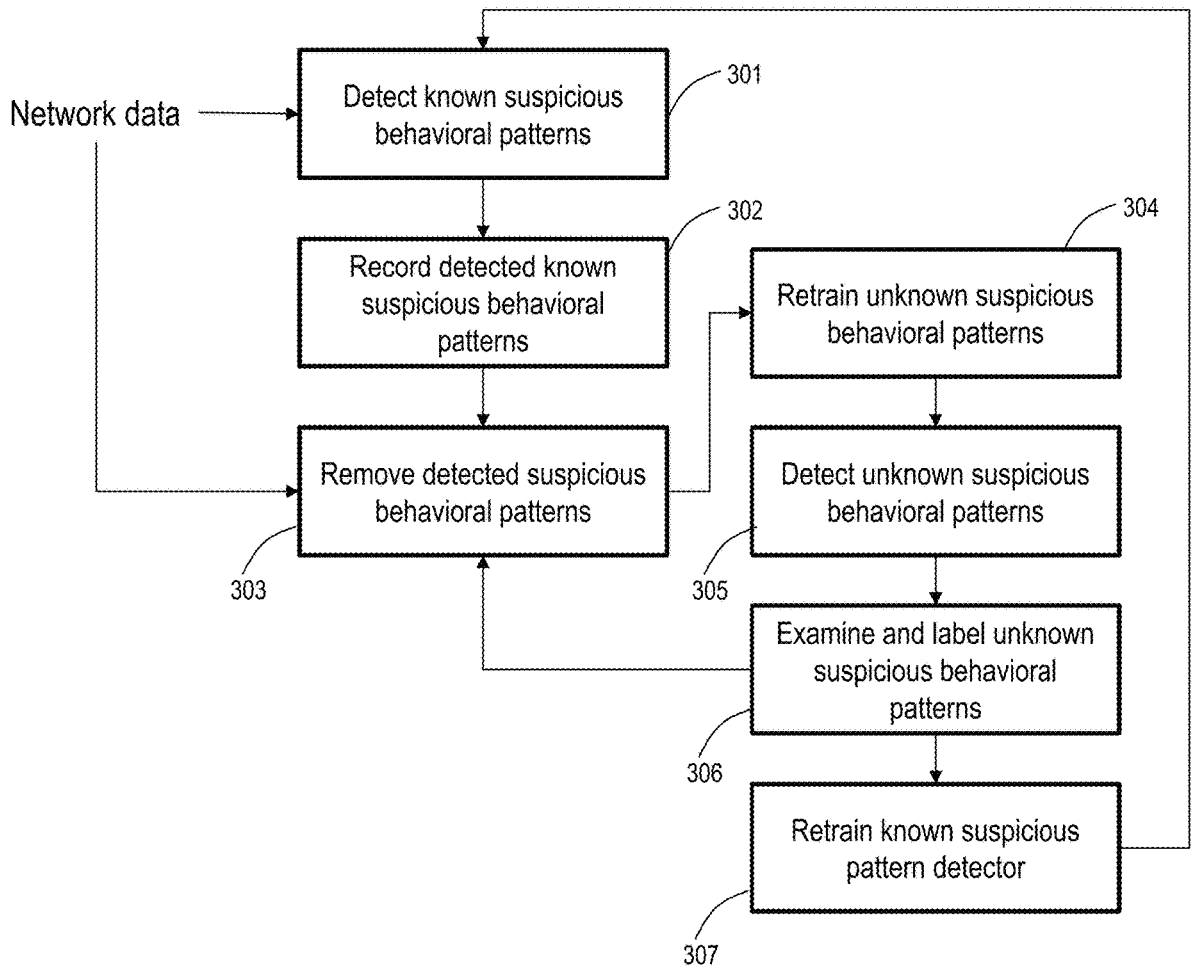
FIG. 17 is a flowchart of a process for reducing false negative.

FIG. 17 is a flowchart of a process 300 for reducing false negative. One way to reduce false positives is to use a hybrid approach for detection, such as with the process 300. Supervised learning is used to detect known suspicious patterns, which are removed from the data stream. This gives a better input for unsupervised training, which should reduce false negatives in detecting unknown suspicious patterns. See, e.g., Fabrizio Angiulli, Luciano Argento, Angelo Furfaro, Andrea Parise, A hierarchical hybrid framework for modelling anomalous behaviours, Simulation Modelling Practice and Theory, Volume 82, 2018, Pages 103-115.

The process 300 includes detecting known suspicious behavioral patterns in network data (step 301), recording detected known suspicious behavioral patterns (step 302), and removing the detected suspicious behavioral patterns (steps 303). The data with the detected suspicious behavioral patterns removed is used to retrain unknown suspicious behavioral patterns (step 304) to detect unknown suspicious behavioral patterns (step 305). The unknown suspicious behavioral patterns are examined and labeled (step 306) to retrain a known suspicious pattern detector (step 307).

Timers

Times can be used to determine if a device is suspicious. For example, observe the device for a period of time T and determine the portion of time it is acting suspiciously. If the portion of time is over a threshold, declare device suspicious or not. The time T can be implemented with a policy (e.g., there can be a different T for every zone). The time T can be learned over time, by, for example, having a target percentage of suspicious devices. For example, if the percentage of detected devices is above threshold increase T, and if the percentage of detected devices is below threshold decrease T.

Training of Trusted Devices

While the devices can be observed in the network, it may also be possible to create training models in the lab/manufacturing floor of trusted devices. For a device type, set up the device in a lab and let it work. Ensure that a range of scenarios associated with the device is covered. Collect the data from the device during this time, which becomes its "normal" data set. Train a one-class classifier using this data (e.g., GAN). The classifier is now able to detect if the device is behaving normally. Distribute the classifier to the edge devices in the network.

Whitelisting Process

Figure 18:
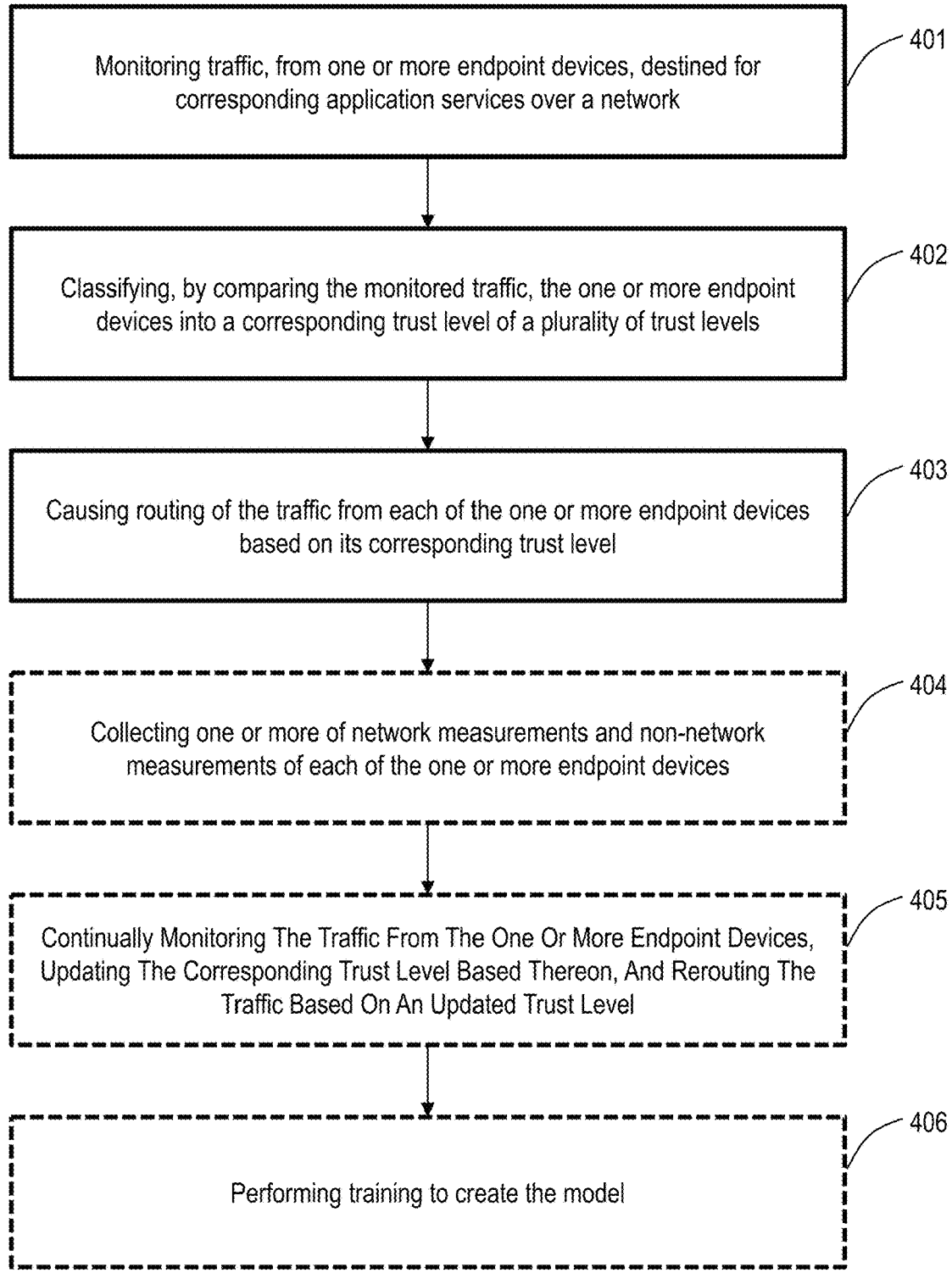
FIG. 18 is a flowchart of a process for device identification and redirection using whitelisting traffic classification.

FIG. 18 is a flowchart of a process 400 for device identification and redirection using whitelisting traffic classification. The process 400 can be implemented in the network edge element 12, embodied as instructions in a non-transitory computer-readable medium, and performed as a method. The process 400 includes monitoring traffic, from one or more endpoint devices, destined for corresponding application services over a network (step 401); classifying, by comparing the monitored traffic, the one or more endpoint devices into a corresponding trust level of a plurality of trust levels (step 402); and causing routing of the traffic from each of the one or more endpoint devices based on its corresponding trust level (step 403).

The monitoring traffic can include collecting one or more of network measurements and non-network measurements of each of the one or more endpoint devices (step 404). The network measurements can include any of timings and sizes of data packets, timings, and headers of data packets, and timings and content of control packets, and the non-network measurements include CPU, memory, and file system utilization; host identifiers; operating system logs; classification may be done with labeled supervised, unlabeled supervised, or unsupervised machine learning. The steps 401, 402, 403 can be performed by a network edge element that is configured to provide network connectivity to the one or more endpoint devices.

For initial connectivity of an endpoint device, the endpoint device is classified in a suspicious trust level and moved based on continuous monitoring. The one or more endpoint devices can be classified by comparing behavior relative to a group of similar types of devices. The process 400 can further include continually monitoring the traffic from the one or more endpoint devices, updating the corresponding trust level based thereon, and rerouting the traffic based on an updated trust level (step 405). The process 400 can further include performing training to create the model (step 406). The training can utilize a one-class classifier that has suspicious/attacking traffic removed from a data set of training traffic.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising steps of:
monitoring packets, by a network edge device having circuitry configured to switch and process the packets, from one or more endpoint devices where the packets are destined for corresponding application services in a network, wherein the one or more endpoint devices are connected to the network and configured to access the corresponding application services through the network edge device;

classifying the one or more endpoint devices based on the monitoring into a corresponding trust level of a plurality of trust levels;

utilizing the corresponding trust level for the one or more endpoint devices for allowing network access to the corresponding application services, including, responsive to a first endpoint device of the one or more endpoint devices being untrusted, steering the packets from the first endpoint device into a restricted zone which is one of simulated in the network edge device and tunneled through the network to a part of the network used to evaluate untrusted devices; and continually monitoring the one or more endpoint devices including the first endpoint device and updating the first endpoint device's trust level and access to the corresponding application services based on the updated first endpoint device's trust level, wherein the restricted zone is one of a forensic zone where traffic capture is enabled for evaluation of activity and a rate-limited zone where traffic is allowed but slowed to allow for monitoring of adversary intent.

2. The method of claim 1, wherein the steps further include responsive to a second endpoint device of the one or more endpoint devices being known bad, malicious, or compromised, performing any of quarantining the second endpoint device, honeypotting the second endpoint device, and disconnecting the second endpoint device.

3. The method of claim 1, wherein the steps further include evaluating the first endpoint device in the restricted zone to determine if the first endpoint device is one of malicious, compromised, and legitimate.

4. The method of claim 1, wherein the restricted zone is a remediation zone where devices access security services to remediate identified deficiencies in their configuration.

5. The method of claim 1, wherein the restricted zone is a rate-limited zone where traffic is allowed but slowed to allow for monitoring of adversary intent.

6. The method of claim 1, wherein the classifying is based on one or more trained machine learning models.

7. The method of claim 1, wherein the classifying is based on at least one unsupervised machine learning model.

8. A non-transitory computer-readable medium comprising instructions that, when executed, cause a processor in a network edge device to perform the steps of:

monitoring packets, by the network edge device having circuitry configured to switch and process the packets, from one or more endpoint devices where the packets are destined for corresponding application services in a network, wherein the one or more endpoint devices are connected to the network and configured to access the corresponding application services through the network edge device;

classifying the one or more endpoint devices based on the monitoring into a corresponding trust level of a plurality of trust levels;

utilizing the corresponding trust level for the one or more endpoint devices for allowing network access to the corresponding application services, including, responsive to a first endpoint device of the one or more endpoint devices being untrusted, steering the packets from the first endpoint device into a restricted zone which is one of simulated in the network edge device and tunneled through the network to a part of the network used to evaluate untrusted devices; and continually monitoring the one or more endpoint devices including the first endpoint device and updating the first endpoint device's trust level and access to the corresponding application services based on the updated first endpoint device's trust level, wherein the restricted zone is one of a forensic zone where traffic capture is enabled for evaluation of activity and a rate-limited zone where traffic is allowed but slowed to allow for monitoring of adversary intent.

9. The non-transitory computer-readable medium of claim 8, wherein the steps further include responsive to a second endpoint device of the one or more endpoint devices being known bad, malicious, or compromised, performing any of quarantining the second endpoint device, honeypotting the second endpoint device, and disconnecting the second endpoint device.

10. The non-transitory computer-readable medium of claim 8, wherein the steps further include evaluating the first endpoint device in the restricted zone to determine if the first endpoint device is one of malicious, compromised, and legitimate.

11. The non-transitory computer-readable medium of claim 8, wherein the restricted zone is a remediation zone where devices access security services to remediate identified deficiencies in their configuration.

12. The non-transitory computer-readable medium of claim 8, wherein the classifying is based on one or more trained machine learning models.

13. The non-transitory computer-readable medium of claim 8, wherein the classifying is based on at least one unsupervised machine learning model.

14. A network edge device comprising circuitry configured to:

monitor packets from one or more endpoint devices where the packets are destined for corresponding application services in a network, wherein the one or more endpoint devices are connected to the network and configured to access the corresponding application services through the network edge device, classify the one or more endpoint devices based on the monitoring into a corresponding trust level of a plurality of trust levels, utilize the corresponding trust level for the one or more endpoint devices for allowing network access to the corresponding application services, including, responsive to a first endpoint device of the one or more endpoint devices being untrusted, steering the packets from the first endpoint device into a restricted zone which is one of simulated in the network edge device and tunneled through the network to a part of the network used to evaluate untrusted devices, and continually monitor the one or more endpoint devices including the first endpoint device and updating the first endpoint device's trust level and access to the corresponding application services based on the updated first endpoint device's trust level, wherein the restricted zone is one of a forensic zone where traffic capture is enabled for evaluation of activity and a rate-limited zone where traffic is allowed but slowed to allow for monitoring of adversary intent.

15. The network edge device of claim 14, wherein the circuitry is further configured to responsive to a second endpoint device of the one or more endpoint devices being known bad, malicious, or compromised, perform any of quarantining the second endpoint device, honeypotting the second endpoint device, and disconnecting the second endpoint device.

16. The network edge device of claim 14, wherein the circuitry is further configured to
evaluate the first endpoint device in the restricted zone to determine if the first endpoint device is one of malicious, compromised, and legitimate.

17. The network edge device of claim 14, wherein the restricted zone is a remediation zone where devices access security services to remediate identified deficiencies in their configuration.

18. The network edge device of claim 14, wherein the one or more endpoint devices are classified based on one or more trained machine learning models.

19. The network edge device of claim 14, wherein the one or more endpoint devices are classified based on at least one unsupervised machine learning model.

* * * * *